United States Patent [19]
Rhoads et al.

[11] Patent Number: 5,050,663
[45] Date of Patent: Sep. 24, 1991

[54] FOLDING HINGE AND WEATHER SEAL FOR A FOLDING WINDOW

[75] Inventors: Barbra D. Rhoads, Troy; Michael A. DeBolt, Dearborn; Ray A. Dickie, Northville Township, Wayne County, all of Mich.

[73] Assignee: Ford Motor Company, Dearborn, Mich.

[21] Appl. No.: 504,144

[22] Filed: Apr. 3, 1990

[51] Int. Cl.$^5$ .............................................. E06B 3/48
[52] U.S. Cl. .................................. 160/231.2; 16/225; 296/107
[58] Field of Search ............... 160/231.2, 231.1, 229.1, 160/230, 370.2, 213; 296/107, 146, 147; 16/225

[56] References Cited

U.S. PATENT DOCUMENTS

| | | | |
|---|---|---|---|
| 884,067 | 4/1908 | Brunke | 160/230 |
| 2,025,926 | 12/1935 | Winter | 160/230 |
| 2,560,493 | 7/1951 | Spring | 160/231.2 X |
| 2,719,804 | 10/1955 | Carlson . | |
| 2,750,030 | 6/1956 | Tierney . | |
| 2,906,657 | 9/1959 | Davidson | 160/231.1 X |
| 3,073,734 | 1/1963 | Bemmels . | |
| 3,192,097 | 6/1965 | Abernathy . | |
| 3,391,050 | 7/1968 | Nebesar . | |
| 3,996,705 | 12/1976 | Gutierreg | 160/231.2 X |
| 4,551,375 | 11/1985 | Sato et al. . | |
| 4,741,571 | 5/1988 | Godette . | |
| 4,761,916 | 8/1988 | Sanok et al. . | |
| 4,778,215 | 10/1988 | Ramaciotti . | |
| 4,799,727 | 1/1989 | Robbins et al. . | |
| 4,885,820 | 12/1989 | Erceg et al. | 16/225 |
| 5,015,028 | 5/1991 | Bonnett | 296/107 |

Primary Examiner—Ramon O. Ramirez
Attorney, Agent, or Firm—Damian Porcari; Roger L. May

[57] ABSTRACT

A hinge and a weather seal are provided for connecting together two adjacent panes in a rear window of an automobile having a fold-down convertible top. The hinge comprises a bonded flexible material, overlapping each adjacent peripheral edge portion of the two panes, on each interior of the rear window surface. The flexible material is preferably bonded to a ceramic frit trim coating located on each adjacent edge portion of the panes so as to screen the flexible material from degradative ultraviolet radiation. The bonded flexible material may comprise a silicone-coated glass fiber cloth having a silicone adhesive thereon for bonding the cloth to the panes. Alternatively, the bonded flexible material may comprise a vinyl-backed cotton fabric dielectrically bonded to the panes. A weather seal, flush with the two panes, is included within a gap located between opposing end portions of the panes. The weather seal may comprise a fluoropolymer resin strip bonded with a silicone adhesive to the end portions of the panes. The weather seal serves to protect the bonded flexible material from environmental degradation.

24 Claims, 2 Drawing Sheets

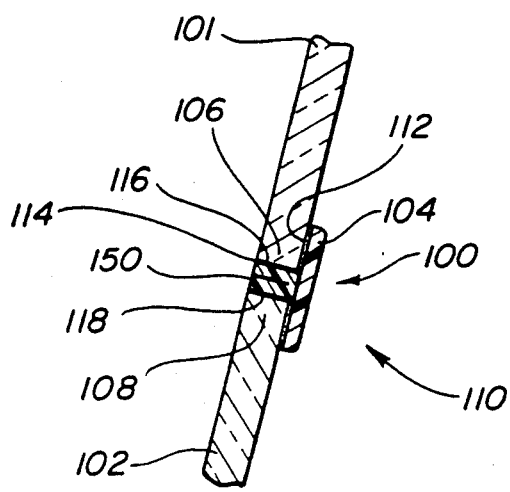
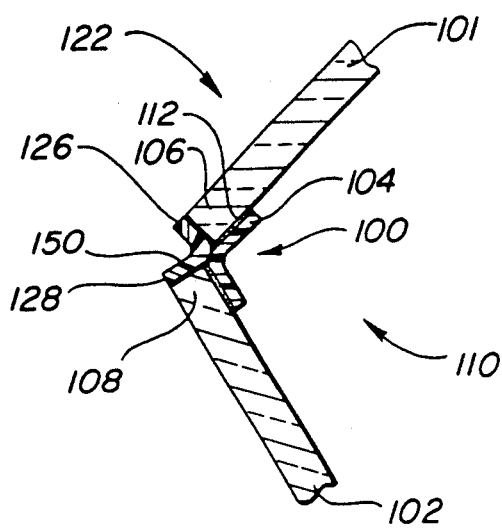
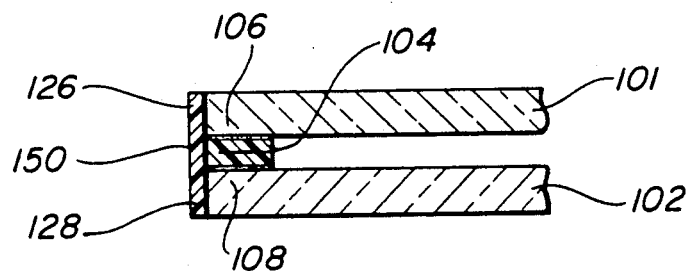
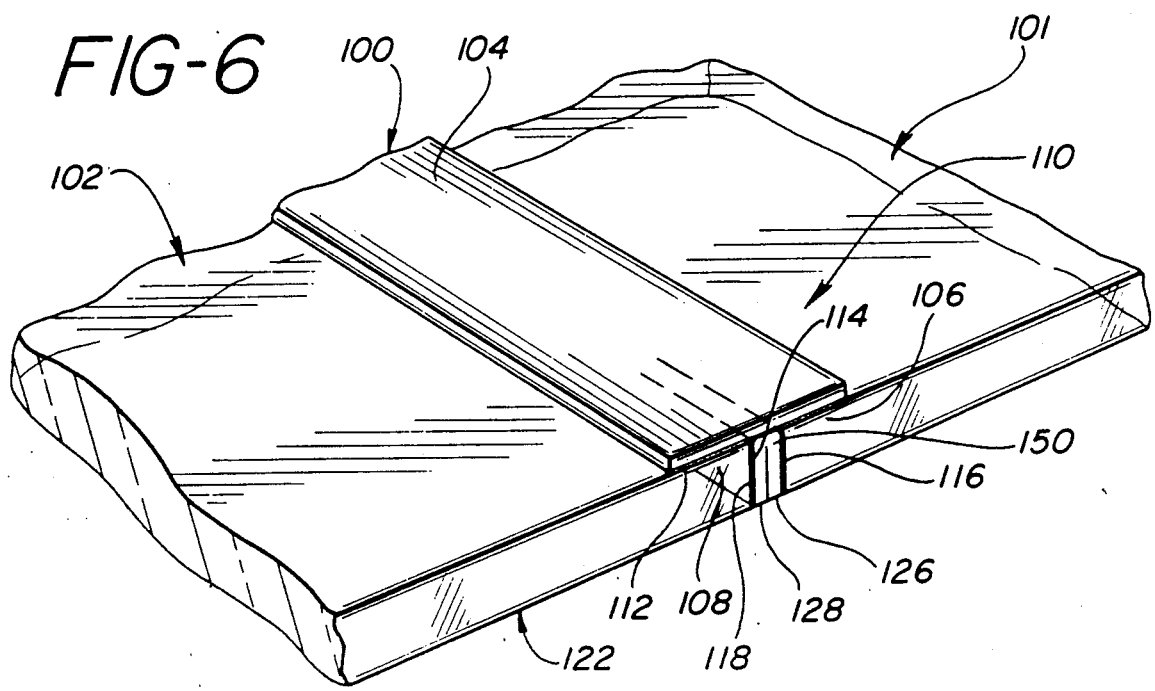

FOLDING HINGE AND WEATHER SEAL FOR A FOLDING WINDOW

BACKGROUND OF THE INVENTION

The present invention relates generally to a window hinge and seal for flexibly connecting together two adjacent panes. More particularly, this invention relates to a folding hinge and a weather seal for connecting together two adjacent panes in a window of an automobile having a fold-down convertible top.

Automobiles having fold-down convertible tops are well-known in the art. These fold-down tops have traditionally included a rear window in order to provide visibility to the rear of the automobile. Usually the rear windows employed in these automobiles have been made from a flexible plastic material. Rear windows made from a flexible plastic material, however, have tended to become brittle and crack over time. Also, such windows have tended to lose their transparency over time due to discoloration, scratches, and the like.

In view of the disadvantages of plastic rear windows, windows made from other transparent materials, such as glass, have been proposed for use in convertible tops for automobiles. In order to use rear windows made from a non-flexible material, such as glass, the rear windows must be of a size to permit the convertible top to fold-down for compact storage. As an attempt to achieve a permissible size for smaller automobiles, it has been proposed to use a folding glass window made from two glass panes connected together by a flexible hinge.

Attempts have been made in the past to create a flexible hinge capable of connecting together two glass panes for use as a folding rear window in a convertible top. For example, U.S. Pat. No. 4,799,727 discloses a flexible hinge for connecting together two glass panes of a rear window for use in a convertible top. This hinge is made from a unitary extrusion of flexible material having two opposing U-shaped channels joined together by an intermediate hinge segment located to one side of the unitary extrusion. A portion of each of the two opposing U-shaped channels extends above the surface of each pane, which may interfere with the scraping of ice and snow from the window. Further, since a substantial amount of stress tending to pull the two panes apart occurs at the intermediate hinge segment when the automobile top is in the up position, the strength of this hinge is questionable.

U.S. Pat. No. 4,761,916 discloses another flexible hinge for connecting together two glass panes of a rear window for use in a convertible top. This hinge comprises two movable gasket members which are each individually bonded to one of the two window panes. The movable gasket members are interconnected along generally adjacent sides by a flexible hinge web. The gasket members and the flexible hinge web are integrally molded from urethane or a urethane-containing material as a one-piece structure. Again, a portion of each of the two gasket members extends above the surface of each pane, which may interfere with the scraping of ice and snow from the window.

Accordingly, there remains a need for an improved flexible hinge having sufficient strength to connect together two transparent panes of a rear window in a fold-down convertible top for an adequate number of folding cycles. Further, there remains a need for an improved flexible hinge which will permit the window in which the hinge is employed to be easily scraped to clear it from ice or snow.

SUMMARY OF THE INVENTION

This need is met by the present invention which sets forth an improved hinge and weather seal for connecting together two adjacent transparent panes of a rear window in an automobile having a fold-down convertible top. The hinge comprises a bonded flexible material, overlapping each adjacent peripheral edge portion of the two panes, on the interior of the rear window surface. The flexible material is bonded to each adjacent edge portion of the panes. The edge portions may optionally have a ceramic frit coating thereon so as to screen the flexible material from degradative ultraviolet radiation. The bonded flexible material may comprise a silicone-coated glass fiber cloth having silicone adhesive thereon for bonding the cloth to the panes. Alternatively, the bonded flexible material may comprise a vinyl-backed cotton fabric dielectrically bonded to the panes. A weather seal, flush with the two panes, is included within a gap located between opposing end portions of the panes. The weather seal may comprise a fluoropolymer resin strip bonded with a silicone adhesive to the end portions of the panes. The weather seal serves to protect the bonded flexible material from environmental degradation.

In accordance with one aspect of the present invention, a folding window for use in an automobile vehicle having a fold-down convertible top is provided and includes a pair of panes comprising a window having an inner surface facing the passenger compartment of the vehicle and an outer surface exposed to the outside environment. Each of the pair of panes has a peripheral edge, with a first portion of the peripheral edge on one of the pair of panes being disposed generally adjacent a first portion of the peripheral edge on the other of the pair of panes. The adjacent peripheral edge portions are spaced from one another by a gap. Flexible strip means are located on the inner surface of the window for joining the adjacent peripheral edge portions of the pair of panes to one another and means are provided for bonding the strip means to the inner surface of the window. Sealing means are located within the gap for sealing the same to protect the flexible strip means from environmental degradation.

The flexible strip means may comprise a glass fiber cloth coated with silicone and the bonding means may comprise a silicone adhesive. The flexible strip means may alternatively comprise a cotton fabric and the bonding means may comprise a vinyl-backing which is bonded to the inner surface of the window. The vinyl-backing is also bonded to the cotton fabric.

The flexible strip means is preferably bonded along the adjacent peripheral edge portions of the pair of panes. Each of the adjacent peripheral edge portions of tee pair of panes preferably includes thereon a ceramic frit trim coating for screening the flexible strip means and the bonding means from degradative ultraviolet radiation.

The sealing means may comprise a fluoropolymer resin bonded within the gap to the pair of panes by a silicone adhesive. The sealing means is preferably located within the gap flush with the outer surface of the window. In this manner, the sealing means will not be damaged by scraping the panes to clear them from ice and snow.

While it is preferred that each of the pair of panes be made from glass because of its long-term transparency and resistance to scratches, the panes may be made of a substantially transparent polymeric resin such as a polycarbonate.

In accordance with a further aspect of the present invention, a folding window for use in an automobile vehicle having a fold-down convertible top is provided and includes a pair of panes comprising a window having an inner surface facing the passenger compartment of the vehicle and an outer surface exposed to the outside environment. Each of the pair of panes has a peripheral edge, with a first portion of the peripheral edge on one of the pair of panes being disposed generally adjacent a first portion of the peripheral edge on the other of the pair of panes. The adjacent peripheral edge portions are spaced from one another by a gap. Flexible tape means are located on the inner surface of the window for joining the adjacent peripheral edge portions of the pair of panes to one another and means are located within the gap for sealing the gap to protect the flexible tape means from environmental degradation.

The flexible tape means comprises a flexible strip and means for bonding the strip to the inner surface of the window. The flexible strip may comprise a glass fiber cloth coated with silicone and the bonding means may comprise a silicone adhesive. The flexible strip may alternatively comprise a cotton fabric and the bonding means may comprise a vinyl backing on the cotton fabric which is dielectrically bonded to the inner surface of the window.

The flexible tape means is preferably bonded along the adjacent peripheral edge portions of the pair of panes. Each of the adjacent peripheral edge portions of the pair of panes preferably includes thereon a ceramic frit trim coating for screening the flexible tape means from degradative ultraviolet radiation.

The sealing means may comprise a fluoropolymer resin bonded to the pair of panes within the gap by a silicone adhesive. The sealing means is preferably located within the gap flush with the outer surface of the window.

While it is preferred that each of the pair of panes be made from glass because of its long-term transparency and resistance to scratches, the panes may be made of a substantially transparent polymeric resin such as a polycarbonate.

In accordance with another aspect of the present invention, a folding panel is provided and includes a pair of rigid sheets comprising a panel having a first surface and a second surface. Each of the pair of sheets has a peripheral edge, with a first portion of the peripheral edge on one of the pair of sheets being disposed generally adjacent a first portion of the peripheral edge on the other of the pair of sheets. The adjacent peripheral edge portions are spaced from one another by a gap. Flexible strip means are located on one of the first and second surfaces of the panel for joining the adjacent peripheral edge portions of the pair of sheets to one another and means are provided for bonding the strip mean to the one of the first and second surfaces of the panel. Sealing means are located within the gap for sealing the same to protect the flexible strip means from environmental contaminates.

The flexible strip means may comprise a glass fiber cloth coated with silicone and the bonding means may comprise a silicone adhesive. The flexible strip means may alternatively comprise a cotton fabric and the bonding means may comprise a vinyl backing which is bonded to one of the first and second surfaces of the panel. The sealing means may comprise a fluoropolymer film bonded within the gap to the pair of sheets by a silicone adhesive.

According to preferred embodiments of the present invention, it is an object to provide an improved hinge and weather seal having sufficient strength to connect together two adjacent transparent panes in a rear window of an automobile having a fold-down convertible top. It is also an object of the present invention to provide an improved hinge and a weather seal which will easily permit the window in which they are employed to be scraped to clear it of ice or snow. This, and other objects and advantages of the present invention, will become apparent from the following detailed description, the accompanying drawings, and the appended claims.

BRIEF DESCRIPTION OF THE DRAWINGS

FIG. 3 is an enlarged partial sectional view of a folding rear window having the improved hinge and weather seal of the present invention taken generally along line 3—3 of FIG. 1;

FIG. 4 is an enlarged partial sectional view of a folding rear window having the improved hinge and weather seal of the present invention taken generally along line 4—4 of FIG. 2;

FIG. 5 is an enlarged partial sectional view of a folding rear window employing the improved hinge and weather seal of the present invention with the window being shown in a down (folded) position; and FIG. 6 is an enlarged partial perspective end view of a rear window in an unfolded position employing the improved hinge and weather seal of the present invention.

DETAILED DESCRIPTION OF THE PREFERRED EMBODIMENT

Figure 1:
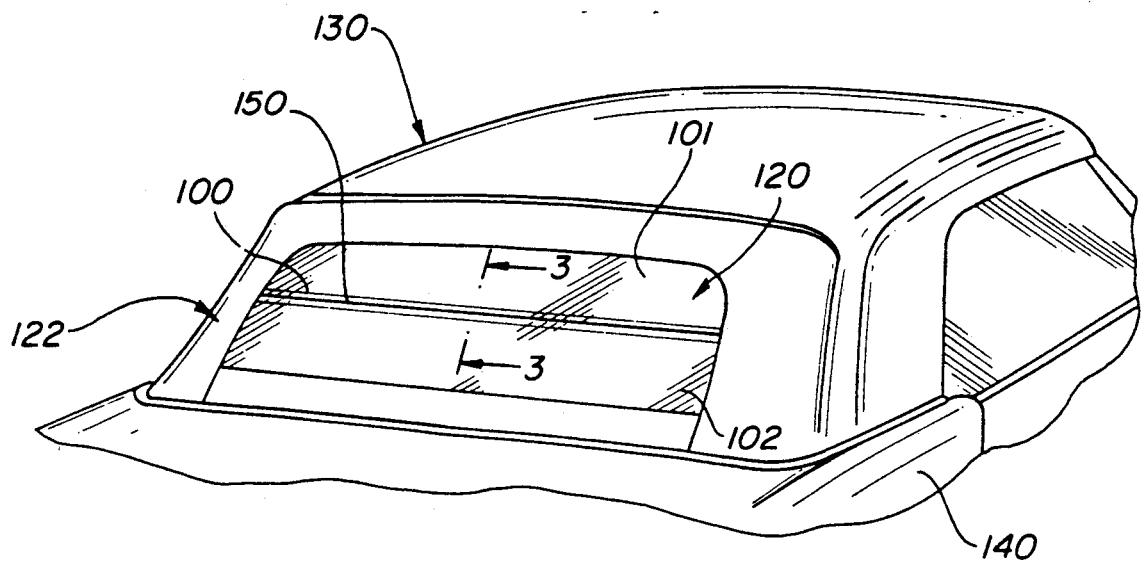
FIG. 1 is a partial perspective view of an automobile vehicle having a fold-down convertible top employing a folding rear window having the improved hinge and weather seal of the present invention, with the convertible top shown in an up position.
Figure 2:
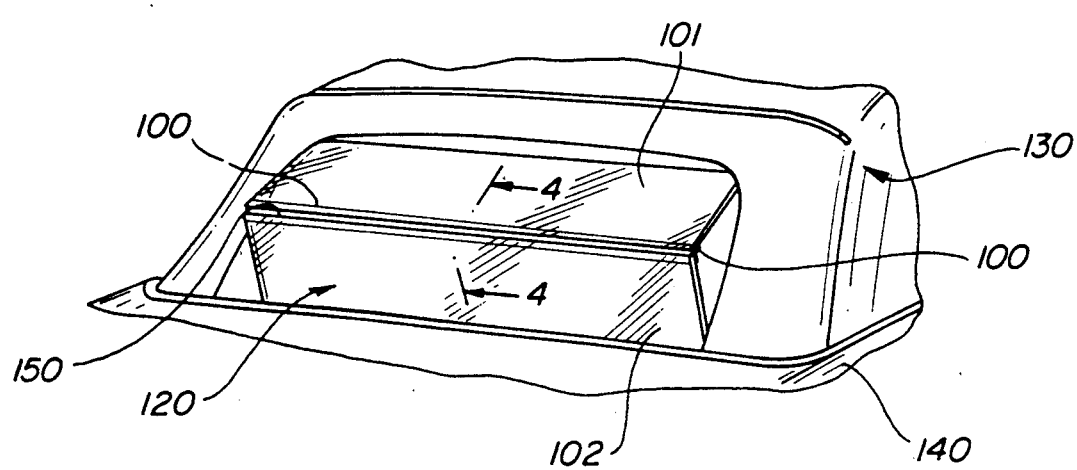
FIG. 2 is a partial perspective view similar to FIG. 1 but illustrating the convertible top and rear window in a partially folded position.

Referring to the drawings and particularly to FIGS. 1 and 2, an improved hinge 100 and weather seal 150 is shown flexibly connecting together an upper window pane 101 and a lower window pane 102 of a foldable window. The foldable window, as shown in FIGS. 1 and 2, may be a rear window 120 of an automobile vehicle 140 having a convertible top 130. Additionally while the invention is being described with reference to a pair of window panes, it will be apparent that the hinge and weather seal of the present invention may be used to connect three or more panes together.

The fold-down convertible top 130 is typically made from a foldable material, such as vinyl, canvas or the like, supported upon a foldable frame (not shown). The fold-down top 130 is capable of being used in an unfolded or "up" position, as shown in FIG. 1, for covering the passenger compartment of the vehicle 140. The fold-down top is also capable of being used in a folded or "down" position for compact storage in a convertible top storage boot for exposing the passenger compartment. FIG. 2 illustrates the top in a partially folded condition.

The upper and lower window panes 101 and 102, comprising rear window 120, are capable of being folded together by way of the hinge 100 and weather seal 150 of the present invention. By permitting the upper and lower window panes 101 and 102 to fold together, the hinge 100 and weather seal 150 permit the rear window 120 to fold-down to a small enough size to allow the convertible top 130 to be stored in a compact position in the convertible top storage boot of the vehicle 140. FIG. 2 illustrates the two panes 101 and 102 folding out and away from the passenger compartment of the vehicle 140. Alternatively, the two panes 101 and 102 may, instead, fold in toward the passenger compartment.

Window panes 101 and 102 are preferably made from a transparent material in order to provide visibility to the rear of the vehicle 140. The preferred material from which the window panes are made is glass since it has very good optical properties, is scratch resistant, and defrosting heating elements (not shown) may be added thereto. Alternatively, the window panes 101 and 102 may be made from a substantially transparent polymeric resin material, such as polycarbonate, an acrylic resin (such as polymethyl methacrylate), and the like.

As shown in more detail in FIGS. 3-6, the hinge 100 comprises a bonded flexible material or tape means 104, overlapping the adjacent peripheral edge portions 106 and 108 of panes 101 and 102, respectively. The bonded flexible material 104 is located on the interior surface 110 of the rear window 120 facing the passenger compartment of the vehicle 140. The flexible material 104 is preferably bonded to a ceramic frit trim coating 112 located along each of the adjacent peripheral edge portions 106 and 108 of the rear window 120. The flexible material 104 and the ceramic frit trim coating 112 preferably comprise a narrow strip so as not to obstruct visibility to the rear of the automobile. The ceramic frit trim coating 112 serves to screen the bonded flexible material 104 from degradative ultraviolet radiation. The process for bonding a ceramic frit trim coating onto a window pane is well known in the art and involves first applying the ceramic frit trim coating onto the pane and subsequently firing the coating so that it adheres to the pane.

The bonded flexible material 104 comprises a flexible strip means and means for bonding the strip means onto each of the edge portions 106 and 108 of the window panes 101 and 102. The flexible strip means may comprise a glass fiber cloth coated with silicone to protect it from moisture. An adhesive, such as a silicone adhesive or the like, located on one side of the glass fiber cloth, may be used as the means for bonding the glass fiber cloth onto each of the edge portions 106 and 108 of window panes 101 and 102. In order to bond the glass fiber cloth onto the edge portions 106 and 108, the cloth is first applied to the edge portions 106 and 108 and the adhesive is subsequently allowed to cure. As is well known in the art, the curing of the silicone adhesive may be accelerated by applying moisture and/or heat to the adhesive.

The flexible strip means may alternatively comprise a cotton fabric having bonding means thereon comprising a backing made from polyvinyl chloride. In order to bond the vinyl-backed cotton fabric to the edge portions 106 and 108, the fabric is first placed on the edge portions 106 and 108 and the vinyl-backing is subsequently dielectrically bonded thereto. The process for dielectrically bonding a vinyl-backed cotton fabric onto a glass pane is known in the art. Such a process involves adding a chemical adhesion promoter to the vinyl-backing and subsequently fusing the vinyl-backing to the glass pane under high temperature and pressure. One known supplier for performing the dielectric bonding process is Findlay Industries, Inc., located in Findlay, Ohio.

The weather seal 150 preferably comprises a fluoropolymer resin, one of which is sold under the tradename of TEDLAR PVF by E. I. du Pont de Nemours and Co. As shown in more detail in FIGS. 3-6, the weather seal 150 is located within a gap 114 located between end portions 116 and 118 of panes 101 and 102, respectively. The seal 150 includes first and second opposing portions 126 and 128, respectively, which are bonded, as by a silicone adhesive, to a respective one of the end portions 116 and 118. The curing of the silicone adhesive may be accelerated by applying moisture and/or heat to the adhesive. Since the seal 150 is located within the gap 114, the seal 150 serves to protect the bonded flexible material 104 from environmental contaminates and degradation.

The weather seal 150 preferably does not extend above the outer surface 122 of the window 120. As a result, there is little risk that the seal 150 may be damaged if the outer surface 122 of the rear window 120 is scraped to clear it of ice or snow.

In use, the hinge 100 and the weather seal 150 act to connect together the upper and lower window panes 101 and 102, as shown in FIG. 1. The hinge 100 and the seal 150 are capable of flexing, as shown in FIGS. 2, 4 and 5 to allow the panes 101 and 102 to move together or apart as the convertible top 130 moves from its unfolded position to its folded position, and visa versa. Since the hinge 100 comprises a bonded flexible material 104 which is shielded from environmental degradation by the weather seal 150 and from ultraviolet radiation by the ceramic frit trim coating, the hinge 100 is capable of connecting together the window panes 101 and 102 for numerous bending cycles without significant risk of separation of either pane from the hinge 100. Further, since the weather seal 150 is located within the gap 114, flush with outer surface 122 of the rear window 120, there is little risk that the hinge 100 or the weather seal 150 will be damaged during scraping of the window 120 to clear it of ice or snow.

While particular embodiments and details thereof have been shown for purposes of illustrating the invention, it will be apparent to those skilled in the art that various changes in the hinge and weather seal disclosed herein may be made without departing from the scope of the invention, which is defined in the appended claims. For example, it is contemplated that the hinge 100 and the seal 150 may be utilized in further applications, in addition to automotive ones, for connecting three or more sheets to form a folding panel.

What is claimed is:

1. A folding window for use in an automobile vehicle having a fold-down convertible tope comprising:
   a pair of panes comprising a window having an inner surface and an outer surface, each of said pair of panes having a peripheral edge, a first portion of said peripheral edge on one of said pair of panes being disposed generally adjacent a first portion of said peripheral edge on the other of said pair of panes, said adjacent peripheral edge portions being spaced from one another by a gap;

flexible strip means located on said inner surface of said window for joining said adjacent peripheral edge portions of said pair of panes to one another;

means for bonding said strip means to said inner surface of said window; and means located within said gap for sealing said gap to protect said flexible strip means from environmental degradation.

2. The folding window of claim 1, wherein said flexible strip means comprises a glass fiber cloth coated with silicone and said bonding means comprises a silicone adhesive.

3. The folding window of claim 1, wherein said flexible strip means comprises a cotton fabric and said bonding means comprises a vinyl backing on said cotton fabric which is dielectrically bonded to said inner surface of said window.

4. The folding window of claim 3, wherein said vinyl backing is bonded to said cotton fabric.

5. The folding window of claim 1, wherein said flexible strip means is bonded along said adjacent peripheral edge portions of said pair of panes.

6. The folding window of claim 5, wherein each of said adjacent peripheral edge portions of said pair of panes includes thereon a ceramic frit trim coating for screening said flexible strip means and said bonding means from degradative ultraviolet radiation.

7. The folding window of claim 1, wherein each of said pair of panes is made from glass.

8. The folding window of claim 1, wherein each of said pair of panes is made from a substantially transparent polymeric resin.

9. The folding window of claim 1, wherein said sealing means comprises a fluoropolymer resin bonded within said gap to said pair of panes by a silicone adhesive.

10. The folding window of claim 1, wherein said sealing means is located within said gap flush with said outer surface of said window.

11. A folding window for use in an automobile vehicle having a fold-down convertible top comprising:

a pair of panes comprising a window having an inner surface and an outer surface, each of said pair of panes having a peripheral edge, a first portion of said peripheral edge on one of said pair of panes being disposed generally adjacent a first portion of said peripheral edge on the other of said pair of panes, said adjacent peripheral edge portions being spaced from one another by a gap;

flexible tape means located on said inner surface of said window for joining said adjacent peripheral edge portions of said pair of panes to one another; and means located within said gap for sealing said gap to protect said flexible tape means from environmental degradation.

12. The folding window of claim 11, wherein said flexible tape means comprises a flexible strip and means for bonding said strip to said inner surface of said window.

13. The folding window of claim 12, wherein said flexible strip comprises a glass fiber cloth coated with silicone and said bonding means comprises a silicone adhesive.

14. The folding window of claim 12, wherein said flexible strip comprises a cotton fabric and said bonding means comprises a vinyl backing on said cotton fabric which is dielectrically bonded to said inner surface of said window.

15. The folding window of claim 11, wherein said flexible tape means is bonded along said adjacent peripheral edge portions of said pair of panes.

16. The folding window of claim 15, wherein each of said adjacent peripheral edge portions of said pair of panes includes thereon a ceramic frit trim coating for screening said flexible tape means from degradative ultraviolet radiation.

17. The folding window of claim 11, wherein said sealing means comprises a fluoropolymer resin bonded to said pair of panes within said gap by a silicone adhesive.

18. The folding window of claim 11, wherein said sealing means is located within said gap flush with said outer surface of said window.

19. The folding window of claim 11, wherein each of said pair of panes is made from glass.

20. The folding window of claim 11, wherein each of said pair of panes is made from a substantially transparent polymeric resin.

21. A folding panel comprising:

a pair of sheets comprising a panel having a first surface and a second surface, each of said pair of sheets having a peripheral edge, a first portion of said peripheral edge on one of said pair of sheets being disposed generally adjacent a first portion of said peripheral edge on the other of said pair of sheets, said adjacent peripheral edge portions being spaced from one another by a gap;

flexible strip means located on one of said first and second surfaces of said panel for joining said adjacent peripheral edge portions of said pair of sheets to one another;

means for bonding said strip mean to said one of said first and second surfaces of said panel; and means located within said gap for sealing said gap to protect said flexible strip means from environmental contaminates.

22. The flexible connector of claim 21, wherein said flexible strip means comprises a glass fiber cloth coated with silicone and said bonding means comprises a silicone adhesive.

23. The flexible connector of claim 21, wherein said flexible strip means comprises a cotton fabric and said bonding means comprises a vinyl backing on said cotton fabric for being dielectrically bonded to said one of said first and second surfaces of said panel.

24. The flexible connector of claim 21, wherein said sealing means comprises a fluoropolymer film bonded within said gap to said pair of sheets by a silicone adhesive.

* * * * *

UNITED STATES PATENT AND TRADEMARK OFFICE
CERTIFICATE OF CORRECTION

PATENT NO. : 5,050,663

DATED : September 24, 1991

INVENTOR(S) : Rhoads et al

It is certified that error appears in the above-identified patent and that said Letters Patent is hereby corrected as shown below:

Col. 6, line 62, change "tope" to --top--.

Signed and Sealed this

Eighteenth Day of May, 1993

Attest:

MICHAEL K. KIRK

Attesting Officer    Acting Commissioner of Patents and Trademarks